United States Patent
Hor-Lao et al.

(10) Patent No.: US 10,708,863 B1
(45) Date of Patent: Jul. 7, 2020

(54) CONTROLLING DEVICE MODEM SCAN DUTY CYCLE BASED ON DEVICE SENSOR OR WIRELESS DATA

(71) Applicant: Motorola Mobility LLC, Chicago, IL (US)

(72) Inventors: Mary Khun Hor-Lao, Chicago, IL (US); Binesh Balasingh, Naperville, IL (US); Ranjeet Gupta, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/267,272

(22) Filed: Feb. 4, 2019

(51) Int. Cl.
| | |
|---|---|
| *G08C 17/00* | (2006.01) |
| *H04W 52/02* | (2009.01) |
| *H04W 4/80* | (2018.01) |
| *H04B 17/318* | (2015.01) |
| *H04W 72/04* | (2009.01) |
| *G06N 20/00* | (2019.01) |

(52) U.S. Cl.
CPC ...... *H04W 52/0241* (2013.01); *H04B 17/318* (2015.01); *H04W 4/80* (2018.02); *H04W 52/0245* (2013.01); *H04W 52/0261* (2013.01); *H04W 72/0453* (2013.01); *G06N 20/00* (2019.01)

(58) Field of Classification Search
CPC ......... H04W 52/0241; H04W 72/0453; H04W 52/0245; H04W 52/0261; H04W 4/80; H04B 17/318; G06N 20/00
USPC ........................................................ 370/311
See application file for complete search history.

(56) References Cited

U.S. PATENT DOCUMENTS

| | | | |
|---|---|---|---|
| 8,411,588 B2* | 4/2013 | Wu | H04W 52/0235 370/254 |
| 2011/0110282 A1* | 5/2011 | Wu | H04W 52/0235 370/311 |
| 2013/0273913 A1* | 10/2013 | Swaminathan | H04W 48/16 455/434 |
| 2014/0018272 A1* | 1/2014 | Thoea | C09K 5/10 508/508 |

(Continued)

OTHER PUBLICATIONS

Doppler, "On efficient discovery of next generation local area networks", Mar. 2011, pp. 269-274.

(Continued)

*Primary Examiner* — Chuong T Ho
(74) *Attorney, Agent, or Firm* — SBMC

(57) ABSTRACT

Various different types of computing devices include a modem that allows the computing device to communicate wirelessly with other devices using various different radio access technologies (RATs). During operation of the computing device, the modem scans for a cell to connect to using a particular RAT, and once found connects to the cell. The computing device also includes a modem scan management system that manages the modem scanning for a cell to connect to, controlling the modem's scanning for a cell to connect to, such as stopping scanning using a particular RAT or reducing the frequency of the scans until movement of the computing device by a significant amount is detected. In response to a significant amount of movement being detected, scanning using the particular RAT can resume or the frequency of the scans can be increased.

20 Claims, 5 Drawing Sheets

(56) References Cited

U.S. PATENT DOCUMENTS

2017/0195957 A1* 7/2017 Debates ............ H04W 52/0222
2019/0364492 A1* 11/2019 Azizi .................... H04W 24/08

OTHER PUBLICATIONS

Singh, "An Energy-Aware WLAN Discovery Scheme for LTE HetNet", Oct. 25, 2017, 22 pages.
Triantafyllopoulou, "Energy Efficient ANDSF-assisted Network Discovery for non-3GPP Access Networks", Sep. 2012, pp. 297-301.

* cited by examiner

US 10,708,863 B1

CONTROLLING DEVICE MODEM SCAN DUTY CYCLE BASED ON DEVICE SENSOR OR WIRELESS DATA

BACKGROUND

As technology has advanced, computing devices have become increasingly mobile. For example, wireless phones, tablets, and smartwatches have become increasingly commonplace. Although these devices make a great deal of functionality available to users, they are not without their problems. One such problem is that these devices are powered by batteries, which eventually need recharging or replacing. However, having devices need their batteries recharged or replaced too frequently can lead to user frustration and dissatisfaction with their devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a determination is made that a computing device is stationary. Whether the computing device is in a fringe area where access to a cell is intermittent or is a weak connection, or in an area with no cell coverage is detected. A modem scan duty cycle for at least one radio access technology is determined based on whether the computing device is in a fringe area or in an area with no cell coverage, and an indication of the modem scan duty cycle for the at least one radio access technology is communicated to a modem of the computing device.

BRIEF DESCRIPTION OF THE DRAWINGS

Embodiments of controlling device modem scan duty cycle based on device sensor or wireless data are described with reference to the following drawings. The same numbers are used throughout the drawings to reference like features and components.

DETAILED DESCRIPTION

Figure 1:
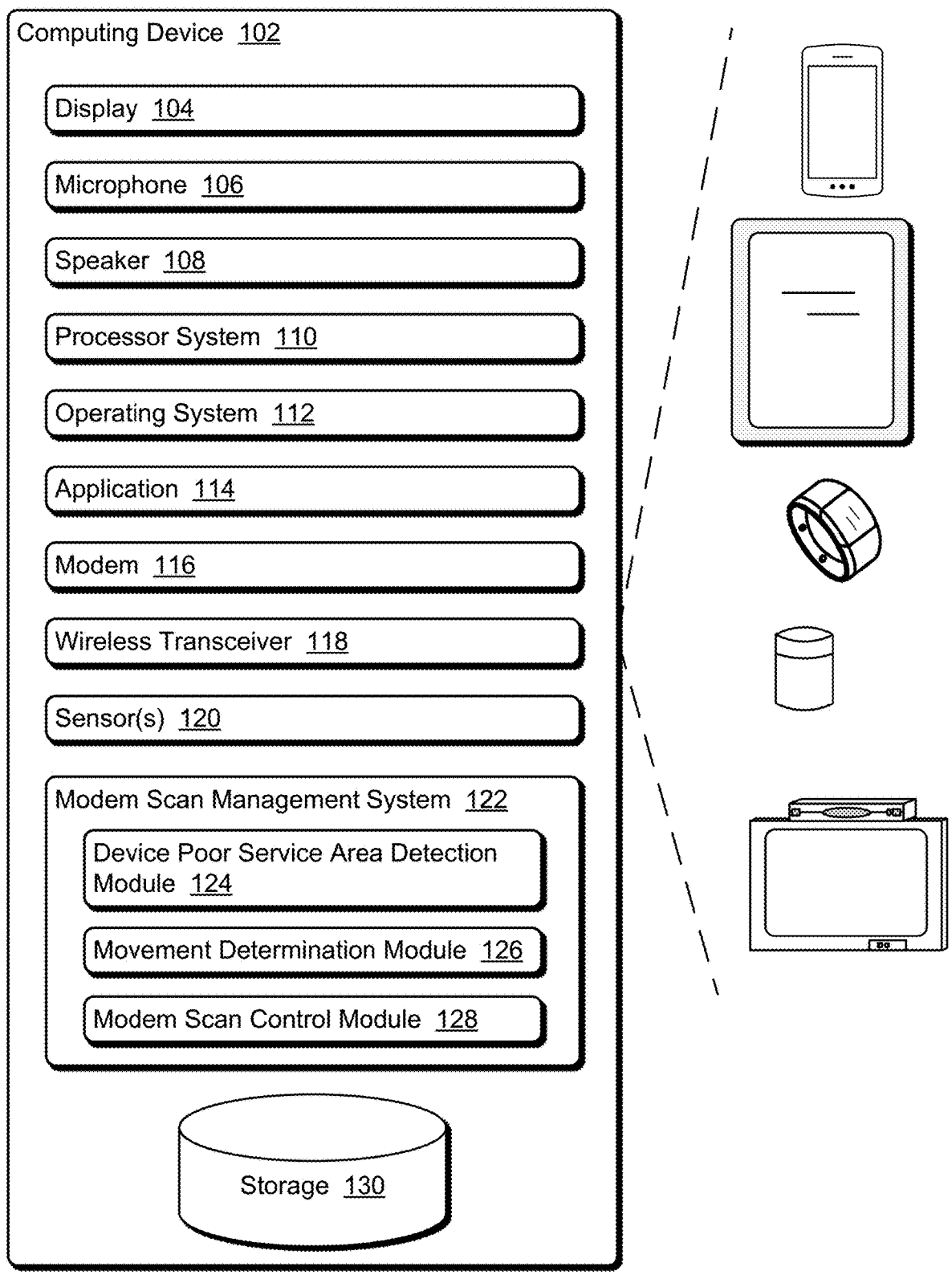
FIG. 1 illustrates an example computing device implementing the techniques discussed herein.

Controlling device modem scan duty cycle based on device sensor or wireless data is discussed herein. Various different types of computing devices include a modem that allows the computing device to communicate wirelessly with other devices. Modems can communicate using various different radio access technologies (RATs), such as third generation (3G) technology, fourth generation (4G) technology or the Long Term Evolution (LTE) standard, fifth generation (5G) technology, and so forth. Modems typically support multiple different RATs and can change which RAT is being used at any given time (e.g., based on the availability of different RATs at the device's current location, in response to a change in RATs at the network side (e.g., as part of load balancing of the network or servers), etc.). These RATs are cellular based, and during operation of the computing device the modem scans for a cell to connect to using a particular RAT, and once found connects to the cell.

The computing device also includes a modem scan management system that manages the modem scanning for a cell to connect to. The modem scan management system can take various actions to control the modem's scanning for a cell to connect to, such as stopping scanning using a particular RAT, reducing the frequency of the scans (within band) for the RATs, reducing the frequency bands scanned for the RATs, and so forth until movement by a significant amount is detected. Movement by a significant amount refers to movement by an amount that is expected to or likely to (e.g., greater than a threshold probability, such as 60%) cause a change in whether a cell of a RAT can be connected to (e.g., movement that matters in terms of radio frequency coverage, such as sufficient movement that the modem is expected to or likely to be able to connect (after the movement) to a cell that the modem could not connect to prior to the movement). Whether movement is a significant amount can be detected in various manners, such as using device sensors or Wi-Fi scan results as discussed in more detail below. In response to a significant amount of movement being detected, scanning using the particular RAT can resume or the frequency of the scans can be increased. Generally, the modem scan management system assumes that if the computing device is not moving very much that connectivity to particular RATs won't change, so action is taken (e.g., stopping scanning using a particular RAT, reducing the frequency of the scans (within band) for the RATs, reducing the frequency bands scanned for the RATs) to conserve power in the computing device until movement by a significant amount is detected.

In one or more embodiments, the modem scan management system determines when the computing device is in a fringe area. A fringe area refers to an area in which access to a cell on a particular RAT is intermittent (sometimes available and sometimes not) or is available but the signal quality is poor or weak. While the computing device is in the fringe area, the modem scan management system can indicate to the modem to stop scanning on that particular RAT. For example if the computing device is configured to give 4G priority over 3G, and the computing device moves to a location where it has a weak 4G connection to a cell and a good 3G connection to a cell, the modem will fall back to 3G, but in the background the modem will continue scanning for a 4G cell. Using the techniques discussed herein, the modem scan management system indicates to the modem to stop scanning for a 4G cell. Ceasing scanning for a 4G cell conserves power in the computing device because power is not expended scanning for the 4G cell and power is not expended switching between a 3G cell and a 4G cell (just to be switched back to the 3G cell because of the weak 4G connection). Furthermore, ceasing scanning for a 4G cell reduces heat buildup in the computing device that can result from repeated switching between a 3G cell and a 4G cell over a short period of time.

In one or more embodiments, the modem scan management system determines when the computing device is in an area with no cell coverage. An area with no cell coverage refers to an area in which no cells are accessible or any cells that are accessible have a signal quality that is poor or weak. While the computing device is in the area with no cell coverage, the modem scan management system can indicate to the modem to reduce the scan duty cycle or stop scanning for cells on all RATs. The scan duty cycle refers to the frequency with which the modem scans for a cell. For example, the modem scan management system can indicate to the modem to stop scanning for cells on all RATs when the device is stationary, and in response to detecting movement of the computing device by a significant amount can indicate to the modem to resume scanning for cells on all RATs. In response to again determining that the computing device is in an area with no cell coverage, the modem scan management system can exponentially increase the scan duty cycle up to a point, such as first scan after ten seconds, then scan after 20 seconds, then scan after 40 seconds, and continue scanning with a scan duty cycle of 40 seconds. In response to determining that the computing device is no longer in an area with no cell coverage, the modem scan management system resets the scan duty cycle to 10 seconds. Reducing the scan duty cycle conserves power in the computing device because the frequency with which power is expended scanning for a cell is reduced. Stopping scanning for cells conserves power in the computing device because no power is expended scanning for a cell.

FIG. 1 illustrates an example computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a wearable device (e.g., a smartwatch, an augmented reality headset or device, a virtual reality headset or device), a tablet or phablet computer, a personal media player, an Internet of Things (IoT) device, a smart speaker, a smart television, a television set-top box, an automotive computer, and so forth.

The computing device 102 optionally includes a display 104. The display 104 can be configured as any suitable type of display, such as an organic light-emitting diode (OLED) display, active matrix OLED display, liquid crystal display (LCD), in-plane shifting LCD, projector, and so forth.

The computing device 102 also includes a microphone 106 and a speaker 108. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores and/or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102.

The computing device 102 also includes a modem 116. The modem 116 allows the computing device 102 to connect wirelessly to a wide area network (e.g., the Internet) via a mobile broadband connection. The modem 116 can connect to the network using various different RATs, such as second generation (2G) technology, 3G technology, 4G technology or the LTE standard, 5G technology, and so forth. The modem 116 supports multiple different RATs and can change which RAT is being used at any given time (e.g., based on the availability of different RATs at the device's current location). During operation of the computing device 102, the modem 116 scans for a cell of the network to connect to using a particular RAT, and once found connects to the cell.

The computing device 102 also includes a wireless transceiver 118. The wireless transceiver 118 can support one or more of any of a variety of different public or proprietary communication networks or protocols, such as wireless local area networks (e.g., Wi-Fi networks), personal area networks (e.g., a peer-to-peer (P2P) network, a neighborhood area network (NAN), a Bluetooth (BT) network, combinations thereof), and so forth. The wireless transceiver 118 can be implemented in any of a variety of different manners, such as using a Wi-Fi card or integrated circuit (IC) chip.

It should be noted that the wireless transceiver 118 supports different communication networks or protocols than the modem 116 supports. For example, the modem 116 supports wide area networks whereas the wireless transceiver 118 supports local area networks and/or personal area networks. The wireless transceiver 118 and the modem 116 can be implemented in separate hardware, or alternatively can be implemented in the same hardware (e.g., the same IC chip).

The computing device 102 also includes one or more sensors 120 that each detect motion of the computing device 102, such as displacement of the computing device 102 (e.g., horizontally and/or vertically), acceleration of the computing device 102, rotation of the computing device 102, and so forth. Examples of sensors 120 include an accelerometer, a gyroscope, a barometer, and so forth. Although illustrated as being included in the computing device 102, additionally or alternatively one or more of the sensors 120 can be external to the computing device 102 (e.g., in communication with the computing device 102 via any of a variety of wired (e.g., USB) or wireless (e.g., Bluetooth or IR) connections).

The computing device 102 also includes a modem scan management system 122. Generally, the modem scan management system 122 assumes that if the computing device 102 is not moving very much that connectivity to particular RATs will not change, so the modem scan management system 122 takes action (e.g., stopping scanning using a particular RAT or reducing the frequency of the scans) to conserve power in the computing device 102 until movement of the computing device 102 by a significant amount is detected. The modem scan management system 122 takes various actions to control the scanning by the modem 116 for a cell to connect to, such as sending a command to the modem 116 to stop scanning using a particular RAT or sending a command to the modem 116 to reduce the frequency of the scans. This stopping or reducing of the frequency of scans continues until movement by a significant amount is detected by the modem scan management system 122. In response to a significant amount of movement being detected, the modem scan management system 122 sends a command to the modem 116 resume scanning using the particular RAT or sends a command to the modem 116 to increase the frequency of the scans.

The modem scan management system 122 includes a device poor service area detection module 124, a movement determination module 126, and a modem scan control module 128. The device poor service area detection module 124 detects when the computing device 102 is in an area with poor service, such as a fringe area or an area with no cell coverage. A fringe area refers to an area in which access to a cell on a particular RAT is sometimes available and sometimes not, or is available but the signal quality is poor or weak. An area with no cell coverage refers to an area in which no cells are accessible or any cells that are accessible have a signal quality that is poor or weak.

The movement determination module 126 determines movement of the computing device 102. This determination includes a direction and distance of movement, allowing the movement determination module 126 to determine whether the computing device 102 has been moved by a significant amount. This also allows the movement determination module 126 to determine a state of the computing device 102, such as whether the computing device 102 is stationary or moving. The movement determination module 126 can determine movement of the computing device 102 in various manners, such as based on data from one or more sensors 120, information derived from wireless signals (e.g., Wi-Fi signals, P2P signals, NAN signals, BT signals, and so forth) received by the computing device 102, and so forth.

The modem scan control module 128 sends commands to the modem 116 to control the modem 116 scanning for a cell to connect to. These commands can include a command to stop scanning using a particular RAT, and a subsequent command to resume scanning using the particular RAT in response to the movement determination module 126 determining that the computing device 102 has been moved by a significant amount. These commands can also include a command to reduce the frequency of the scans (also referred to as the scan duty cycle), and a subsequent command to increase the frequency of the scans in response to the movement determination module 126 determining that the computing device 102 has been moved by a significant amount.

The modem scan management system 122 can be implemented in a variety of different manners. For example, the modem scan management system 122 can be implemented as multiple instructions stored on computer-readable storage media and that can be executed by the processor system 110. Additionally or alternatively, the modem scan management system 122 can be implemented at least in part in hardware (e.g., as an application-specific integrated circuit (ASIC), a field-programmable gate array (FPGA), and so forth).

The computing device 102 also includes a storage device 130, which can be implemented using any of a variety of storage technologies, such as magnetic disk, optical disc, Flash or other solid state memory, and so forth. The storage device 130 stores various information for the operating system 112, application 114, and modem scan management system 122.

Figure 2:
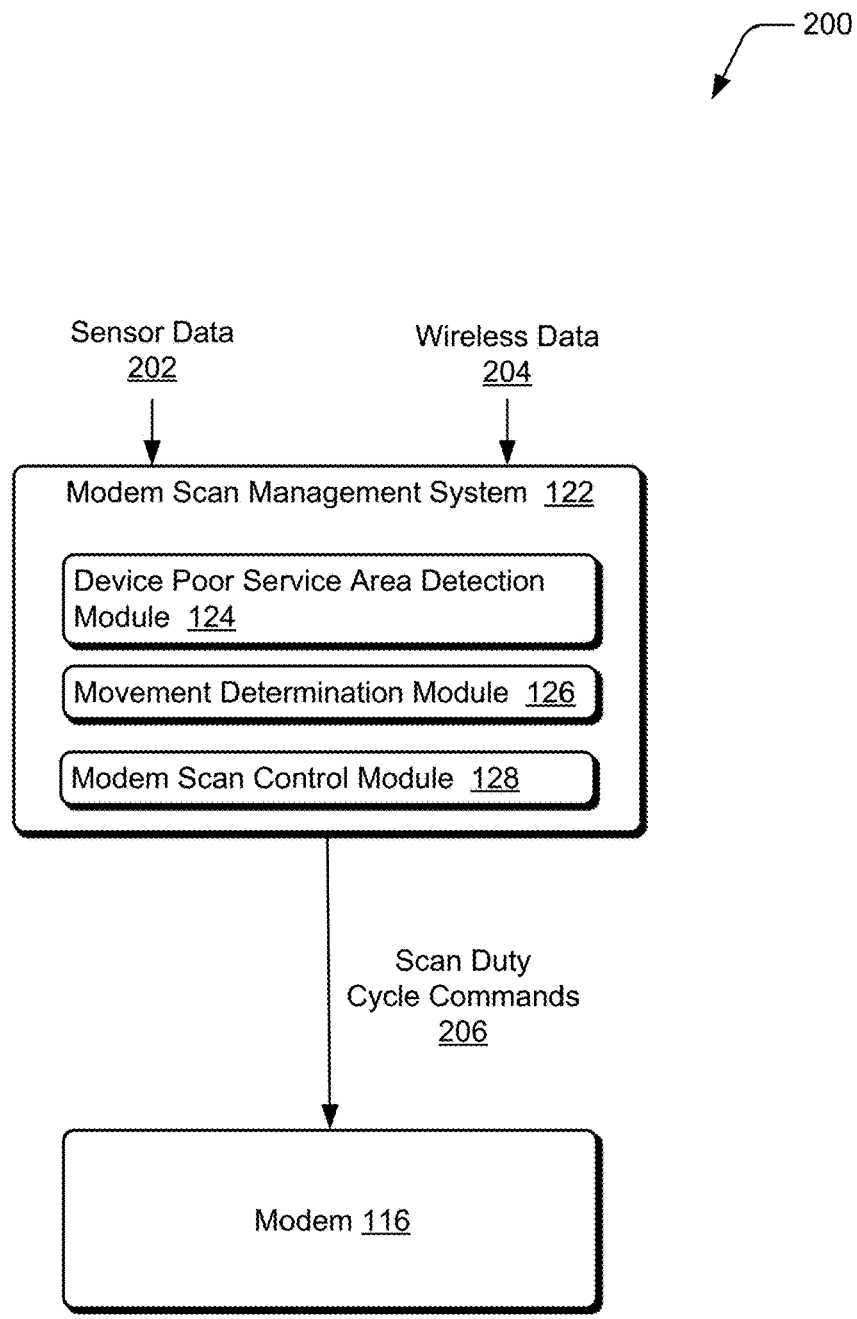
FIG. 2 illustrates an example system implementing the techniques discussed herein.

FIG. 2 illustrates an example system 200 implementing the techniques discussed herein. The system 200 is implemented by a computing device, such as the computing device 102 of FIG. 1. The system 200 includes the modem scan management system 122 and the modem 116. The modem scan management system 122 includes the device poor service area detection module 124, the movement determination module 126, and the modem scan control module 128 as discussed above. The modem scan management system 122 receives sensor data 202 from one or more sensors (e.g., the sensors 120 of FIG. 1) and wireless data 204 from a wireless transceiver (e.g., the wireless transceiver 118 of FIG. 1). The wireless data 204 can be any of variety of different types of wireless data, such as Wi-Fi data, P2P data, NAN data, BT data, and so forth. Based on one or both of the sensor data 202 and the wireless data 204, the modem scan management system 122 generates and sends scan duty cycle commands 206 to the modem 116.

The modem scan management system 122 can generate scan duty cycle commands 206 based on both the sensor data 202 and the wireless data 204. However, it should be noted that although the system 200 illustrates both sensor data 202 and wireless data 204, the modem scan management system 122 may receive or rely on only one of the sensor data 202 and the wireless data 204. For example, the modem scan management system 122 can generate scan duty cycle commands 206 based on only the sensor data 202. By way of another example, the modem scan management system 122 can generate scan duty cycle commands 206 based on only the wireless data 204.

The device poor service area detection module 124 detects when the device implementing system 200 is in a fringe area or an area with no cell coverage. As discussed above, a fringe area refers to an area in which access to a cell on a particular RAT is sometimes available and sometimes not, or is available but the signal quality is poor or weak. For example, the fringe area is an area at the outermost range of the cell and at which the modem 116 may be able to connect to but quickly lose the connection (e.g., within 5 or 10 seconds of establishing the connection) or at which the modem may be able to connect to but with a poor or weak quality signal (e.g., less than a threshold signal quality).

While in the fringe area, the modem 116 is likely to switch frequently between two different RATs. For example, assume the device implementing system 200 is configured to give 4G priority over 3G, and the computing device moves to a location where the modem 116 has a weak 4G connection to a cell and a good 3G connection to a cell. In this situation, traditionally the modem 116 will fall back to 3G, but in the background the modem 116 will continue scanning for a 4G cell. When the modem 116 detects the 4G cell the modem 116 will switch to 4G, then in a short time (e.g., within 30 seconds or 1 minute) fall back to 3G because the 4G connection is weak. This process continues, with the modem switching back and forth (toggling) between 3G and 4G, which is also referred to as flip flopping. The techniques discussed herein resolve this situation by the modem scan control module 128 sending a scan duty cycle command 206 to the modem 116 informing the modem 116 to cease scanning for a cell on the RAT with the weak connection (4G in this example), as discussed in more detail below. This can also be viewed as changing the scan duty cycle to zero, indicating that the frequency of scans on that RAT is zero.

The device poor service area detection module 124 can detect whether the computing device is in a fringe area in any of a variety of different manners. In one or more embodiments, the device poor service area detection module 124 obtains one or more of various different signal strength indicators from the modem 116 for a RAT, and if the obtained value for a signal strength indicator does not satisfy a threshold value (e.g., is less than the threshold value), then the device poor service area detection module 124 determines that the device implementing system 200 is in the fringe area of the cell for that RAT. Examples of different signal strength indicators that can be used by the device poor service area detection module 124 include a Received Signal Strength Indicator (RSSI), a Reference Signal Received Power (RSRP) indicator, a Reference Signal Received Quality (RSRQ) indicator, a Received Signal Code Power (RSCP) indicator, a Signal to Interference plus Noise Ratio (SINR) indicator, and a downlink carrier-to-interference ratio (EC/IO) indicator. For example, the device poor service area detection module 124 may determine that the device implementing system 200 is in the fringe area of the cell for 4G if the RSRQ value is less than −15 dB (decibels) but greater than −20 dB. Various additional rules or algorithms can also be used to take various combinations of one or more of these signal strength indicators to generate a value to determine whether the device implementing system 200 is in the fringe area of the cell for the RAT.

Additionally or alternatively, the device poor service area detection module 124 can use other values or indicators to determine whether the device implementing system 200 is in the fringe area of the cell for a RAT. These values or indicators can be obtained in various manners, such as from the modem 116. One such value or indicator is a frequency with which the modem 116 switches between two RATs. If the frequency with which the modem 116 switches between two RATs exceeds a threshold amount (e.g., more frequently than every 30 seconds) then the device poor service area detection module 124 can determine that the device implementing system 200 is in the fringe area of the cell of the RAT having the weaker connection of the two RATs.

Another value or indicator that can be used by the device poor service area detection module 124 to determine whether the device implementing system 200 is in the fringe area of the cell for a RAT is a bit rate used for the RAT. For example, the device poor service area detection module 124 can determine that the device implementing system 200 is in the fringe area of the cell for a RAT if the bit rate used for the RAT is less than a threshold amount (e.g., 10% of the maximum bit rate supported by the RAT). Another value or indicator that can be used by the device poor service area detection module 124 to determine whether the device implementing system 200 is in the fringe area of the cell for a RAT is channel grants for the RAT. For example, the device poor service area detection module 124 can determine that the device implementing system 200 is in the fringe area of the cell for a RAT if the channel grants used for the RAT are less than a threshold amount (e.g., 10% of the maximum resource usage supported by the RAT).

It should be noted that the signal strength indicators or other values used by the device poor service area detection module 124 to determine whether the device implementing system 200 is in a fringe area is specific to a particular RAT. Different RATs can, and typically do, have different signal strength indictors or other values used by the device poor service area detection module 124 to determine whether the device implementing system 200 is in a fringe area.

The device poor service area detection module 124 also detects when the device implementing system 200 is in an area with no cell coverage. As discussed above, an area with no cell coverage refers to an area in which no cells are accessible or any cells that are accessible have a signal quality that is poor or weak. A poor or weak signal quality can be determined using any of a variety of different signal strength indicators from the modem 116 for a RAT, such as any one or more of the RSSI, RSRP, RSRQ, RSCP, SINR, and EC/IO indicators discussed above. If the obtained value for a signal strength indicator does not satisfy a threshold value (e.g., is less than the threshold value), then the device poor service area detection module 124 determines that the device implementing system 200 is in an area with no cell coverage. For example, the device poor service area detection module 124 may determine that the device implementing system 200 is in an area with no cell coverage for 4G if the RSRQ value is less than −20 dB. Various additional rules or algorithms can also be used to take various combinations of one or more of these signal strength indicators to generate a value to determine whether the device implementing system 200 is in an area with no cell coverage for the RAT.

If the device poor service area detection module 124 determines that the device implementing system 200 is in an area with no cell coverage for each RAT supported by the modem 116, then the device poor service area detection module 124 determines that the computing device is in an area with no cell coverage. Additionally or alternatively, the device poor service area detection module 124 can determine that the device implementing system 200 is in an area with no cell coverage if there is no cell coverage for each of one or more RATs that are enabled or otherwise indicated as usable by the modem. For example, the modem may support 2G, 3G, and 4G technologies but have only 3G and 4G technologies enabled, so the device poor service area detection module 124 determines that the device implementing system 200 is in an area with no cell coverage if there is no cell coverage for each of the 3G and 4G technologies (regardless of whether there is cell coverage for the 2G technology).

The movement determination module 126 determines movement of the device implementing system 200. The movement determination module 126 determines whether the device implementing system 200 has been moved a significant amount. This determination is made over a particular amount of time (e.g., 10 seconds). This determination is used to detect when the device implementing system 200 is stationary, and once stationary when the device implementing system 200 is no longer stationary. While the device implementing system 200 is stationary the modem duty scan cycle can be reduced and/or stopped for one or more RATs as discussed in more detail below.

In one or more embodiments, the movement determination module 126 determines whether the device implementing system 200 has been moved a significant amount based on the sensor data 202. Any of a variety of different rules, criteria, or algorithms can be applied to determine, based on the sensor data 202, whether the device implementing system 200 has been moved a significant amount. For example, the movement determination module 126 can use a single threshold distance (e.g., 5 meters), and determine that the device implementing system 200 has moved a significant amount if the device moves at least the threshold distance in any direction. By way of another example, the movement determination module 126 can use different threshold distances for different dimensions (e.g., 5 meters horizontally and 2 meters vertically), and determine that the device implementing system 200 has moved a significant amount if the device moves at least the threshold distance in the appropriate direction (e.g., at least 5 meters horizontally or at least 2 meters vertically).

By way of another example, different threshold values or distances can be used for different sensors. E.g., the movement determination module 126 can use a first threshold distance (e.g., 5 meters) for a first sensor and a second threshold distance (e.g., 10 meters) for a second sensor, and determine that the device implementing system 200 has moved a significant amount if the first sensor indicates that the device has moved at least the first threshold distance, or if the second sensor indicates that the device has moved at least the second threshold distance.

The movement determination module 126 can apply various different Boolean operations to values from different sensors to determine whether the device implementing system 200 has moved a significant amount, such as logical OR operations, logical AND operations, and so forth.

By way of another example, the movement determination module 126 can use a machine learning system and the sensor data 202 to determine whether the device implementing system 200 has moved a significant amount. Such a machine learning system can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

Such a machine learning system can be trained in a variety of different manners. In one or more embodiments, the machine learning system is trained based on multiple sets of training data. Each set of training data includes some sensor data 202 and an indication of whether that sensor data 202 indicates movement by a significant amount. For each set of training data, the machine learning system analyzes the sensor data in the set, and determines whether the sensor data in the set indicates movement by a significant amount. This determination is compared to the indication in the set of whether that sensor data 202 in the set indicates movement by a significant amount, and then various weights or filter values of the machine learning system can be updated based on whether the determination by the machine learning system of whether the sensor data 202 in the set indicates movement by a significant amount is the same as the indication in the set of whether the sensor data 202 in the set indicates movement by a significant amount.

The machine learning system can be pre-trained using multiple sets of training data obtained from various different users, generated by a developer or designer of the modem scan management system 122, and so forth. Additionally or alternatively, the machine learning system can be trained using a set of training data obtained during use of the system 200. For example, the device implementing system 200 may be moved a particular amount as indicated by the sensor data 202. This sensor data is used by the system 200 as training data, and the modem 116 scans for a cell. If there was no cell detected by the scan of the modem 116 prior to the movement, and there was still no cell detected by the scan of the modem 116 after the movement, then the movement was not movement by a significant amount. However, if there was no cell detected by the scan of the modem 116 prior to the movement, and there was a cell detected by the scan of the modem 116 after the movement, then the movement was movement by a significant amount. By using a set of training data obtained during use of the system 200, the machine learning system is trained for a particular user of the device implementing system 200 and the manner in which that particular users uses the device implementing system 200.

Additionally or alternatively, the movement determination module 126 determines whether the device implementing system 200 has been moved a significant amount based on the wireless data 204. The wireless data 204 can include various different information depending on the type of the wireless data. For example, in situations in which the wireless data 204 includes Wi-Fi data, the wireless data can be an indicator or name of a Wi-Fi network (e.g., the service set identifier (SSID) or basic service set identifier (BSSID) of the Wi-Fi network), any of a variety of signal strength indicators (e.g., RSSI, RSRP, etc. as discussed above) for a Wi-Fi network, and so forth. By way of another example, in situations in which the wireless data 204 includes P2P data, the wireless data 204 can be identifiers of other P2P devices within range of the computing device 102. By way of another example, in situations in which the wireless data 204 includes NAN data, the wireless data 204 can be an indicator or name of a NAN network, an indicator of signal strength from an access point, and so forth. By way of another example, in situations in which the wireless data 204 includes BT data, the wireless data 204 can be identifiers of other Bluetooth devices within range of the computing device 102.

Any of a variety of different rules, criteria, or algorithms can be applied to determine, based on the wireless data 204, whether the device implementing system 200 has been moved a significant amount. For example, the movement determination module 126 can determine that the device implementing system 200 has moved a significant amount if a Wi-Fi network (e.g., as indicated by the SSID or BSSID) is no longer within range of the wireless transceiver 118, if a new Wi-Fi network (e.g., as indicated by the SSID or BSSID) comes within range of the wireless transceiver 118, if the signal strength of a network increases or decreases by a threshold amount (e.g., 25 dB), if a Bluetooth device is no longer within range of the wireless transceiver 118, if a new Bluetooth device comes within range of the wireless transceiver 118, if a given access point is no longer within range of the wireless transceiver 118, if a new access point comes within range of the wireless transceiver 118, and so forth.

The movement determination module 126 can apply various different Boolean operations to different wireless data 204 to determine whether the device implementing system 200 has moved a significant amount, such as logical OR operations, logical AND operations, and so forth.

By way of another example, the movement determination module 126 can use a machine learning system and the wireless data 204 to determine whether the device implementing system 200 has moved a significant amount. Such a machine learning system can be implemented using various different machine learning techniques as discussed above with reference to the sensor data 202. Such a machine learning system can be trained in a variety of different manners. In one or more embodiments, the machine learning system is trained based on multiple sets of training data. Each set of training data includes some wireless data 204 and an indication of whether that wireless data 204 indicates movement by a significant amount. For each set of training data, the machine learning system analyzes the sensor data in the set, and determines whether the sensor data in the set indicates movement by a significant amount. This determination is compared to the indication in the set of whether that wireless data 204 in the set indicates movement by a significant amount, and then various weights or filter values of the machine learning system can be updated based on whether the determination by the machine learning system of whether the wireless data 204 in the set indicates movement by a significant amount is the same as the indication in the set of whether the wireless data 204 in the set indicates movement by a significant amount.

The machine learning system can be pre-trained using multiple sets of training data obtained from various different users, generated by a developer or designer of the modem scan management system 122, and so forth. Additionally or alternatively, the machine learning system can be trained using a set of training data obtained during use of the system 200. For example, the device implementing system 200 may be moved a particular amount as indicated by the wireless data 204. This wireless data 204 is used by the system 200 as training data, and the modem 116 scans for a cell. If there was no cell detected by the scan of the modem 116 prior to the movement, and there was still no cell detected by the scan of the modem 116 after the movement, then the movement was not movement by a significant amount. However, if there was no cell detected by the scan of the modem 116 prior to the movement, and there was a cell detected by the scan of the modem 116 after the movement, then the movement was movement by a significant amount. By using a set of training data obtained during use of the system 200, the machine learning system is trained for a particular user of the device implementing system 200 and the manner in which that particular users uses the device implementing system 200.

In one or more embodiments, the movement determination module 126 determines whether the device implementing system 200 has moved a significant amount based on the BSSID values and corresponding RSSI values received by a transceiver of the device implementing system 200. Each time the transceiver scans for Wi-Fi networks, it receives the BSSID of each network within range of the transceiver and determines an RSSI value for each BSSID indicating the signal strength of that BSSID. The movement determination module 126 maintains the BSSID and RSSI values from the previous scan and compares those values to the BSSID and RSSI values of the current scan.

If the BSSID values from the previous and current scans match by at least a threshold amount (e.g., the BSSID values from the two scans are at least 85% the same), then the device implementing system 200 is determined to have not moved a significant amount. If the BSSID values from the previous and current scans do not match by at least a threshold amount (e.g., the BSSID values from the two scans are less than 85% the same), then the device implementing system 200 is determined to have moved a significant amount. If the BSSID values from the previous and current scans match by at least a threshold amount (e.g., the BSSID values from the two scans are at least 85% the same), but the RSSI values fluctuate within a threshold range (e.g., 3 dB), then the device implementing system 200 is determined to have not moved a significant amount but is in a fidgeting state. This fidgeting state is, for example, when the user is stationary but is fidgeting with the device implementing system 200 (e.g., spinning the device in his or her hand).

It should be noted that the movement determination module 126 can determine whether the device implementing system 200 has moved a significant amount based on the sensor data 202, the wireless data 204, or a combination of the sensor data 202 and the wireless data 204. For example, various different rules, criteria, and algorithms can be applied, analogous to the discussion above, to both the sensor data 202 and the wireless data 204 to determine whether the device implementing system 200 has moved a significant amount. E.g., if either the sensor data 202 or the wireless data 204 indicates that the device has moved a significant amount, then the movement determination module 126 determines that the device has moved a significant amount. Or, the movement determination module 126 can implement a machine learning system that uses and is trained on both the sensor data 202 and the wireless data 204.

The modem scan control module 128 sends commands to the modem 116 to control the modem 116 scanning for a cell to connect to. The commands can change the scan duty cycle of the modem 116, including causing the modem 116 to stop scanning for a particular RAT. In one or more embodiments, the modem scan control module 128 determines whether the device implementing system 200 is stationary. The modem scan control module 128 can determine whether the device implementing system 200 is stationary in a variety of different manners. For example, if the sensor data 202 indicates that the device implementing system 200 has not moved for a threshold amount of time (e.g., 15 seconds), then the modem scan control module 128 can determine that the device is stationary. By way of another example, if the movement determination module 126 determines that the device implementing system 200 has not moved by a significant amount for a particular amount of time (e.g., 15 seconds), then the modem scan control module 128 can determine that the device is stationary.

While the device is determined to be stationary, the modem scan control module 128 issues commands to the modem 116 to alter the scan duty cycle of the modem 116 (e.g., by reducing the scan duty cycle or by stopping scanning for a particular RAT or a particular frequency band). In one or more embodiments, in response to the device poor service area detection module 124 determining that the device is in a fringe area, the modem scan control module 128 sends a command to the modem 116 to stop scanning on a particular RAT. The modem scan control module 128 sends a command to the modem 116 to stop scanning on the RAT with the weak connection, but does not stop the scanning on other RATs.

For example, assume the device implementing system 200 is configured to give 4G priority over 3G, and the computing device moves to a location where the modem 116 has a weak 4G connection to a cell and a good 3G connection to a cell. In this situation, in contrast to traditional systems in which the modem 116 will fall back to 3G, but in the background the modem 116 will continue scanning for a 4G cell, resulting in flip flopping as discussed above, the modem scan control module 128 sends a command to the modem 116 to stop scanning on the RAT with the weak connection (the 4G connection). This command can take various forms, such as a command to disable 4G communication on the modem 116, a command to leave 4G communication on the modem 116 enabled but to stop scanning for a cell on 4G, and so forth.

Subsequently, in response to the movement determination module 126 determining that the device implementing system 200 has moved a significant amount, the modem scan control module 128 sends a command to the modem 116 to resume scanning on the RAT with the weak connection (e.g., the 4G connection in the previous example). This command can take various forms, such as a command to enable 4G communication on the modem 116, a command to resume scanning for a cell on 4G, and so forth.

Additionally or alternatively, while the device is determined to be stationary, in response to the device poor service area detection module 124 determining that the device is in an area with no cell coverage, the modem scan control module 128 sends a command to the modem 116 to reduce the scan duty cycle on all RATs, to stop scanning for cells on all RATs, or to reduce the frequency bands that RATs are scanned for on all RATs (e.g., changing the scan duty cycle for one or more frequency bands of a RAT to zero). Reducing the scan duty cycle refers to reducing the frequency with which the modem scans for a cell, such as reducing the frequency from once every 10 seconds to once every 40 seconds.

In one or more embodiments, the modem scan control module 128 sends a command to the modem 116 to reduce the scan duty cycle on all RATs, and the modem 116 continues to scan at this reduced rate until instructed otherwise by the modem scan control module 128. Alternatively, at regular or irregular intervals the modem scan control module 128 can send a command to the modem 116 to further reduce the scan duty cycle on all RATs. For example, in response to the device poor service area detection module 124 determining that the device is in an area with no cell coverage, the modem scan control module 128 sends a command to the modem 116 to reduce the scan duty cycle on all RATs from once every 10 seconds to once every 20 seconds. If on the next scan the device is still in an area with no cell coverage, the modem scan control module 128 sends a command to the modem 116 to reduce the scan duty cycle on all RATs from once every 20 seconds to once every 40 seconds. If on the next scan the device is still in an area with no cell coverage, the modem scan control module 128 sends a command to the modem 116 to reduce the scan duty cycle on all RATs from once every 40 seconds to once every 80 seconds. This continued further reduction in the scan duty cycle can continue until a threshold scan duty cycle is met (e.g., a scan duty cycle of once every 160 seconds).

Additionally or alternatively, the modem scan control module 128 sends a command to the modem 116 to reduce the frequency bands that RATs are scanned for on all RATs. Different RATs can operate using different frequency bands and a scan on a RAT can include scanning for a RAT on all of those different frequency bands. Accordingly, the modem scan control module 128 can send a command to the modem 116 to reduce the number of those different frequency bands that are scanned. For example, a particular RAT may support two different frequency bands. The modem scan control module 128 can send a command to the modem 116 to stop scanning for a RAT on one of those two different frequency bands (changing the scan duty cycle for that frequency band to zero) but continue scanning for a RAT on the other of those two different frequency bands (optionally at a reduced scan duty cycle).

Subsequently, in response to the movement determination module 126 determining that the device implementing system 200 has moved a significant amount, the modem scan control module 128 sends a command to the modem 116 to resume scanning on all RATs at a standard or regular scan duty cycle (e.g., once every 10 seconds).

Figure 3:
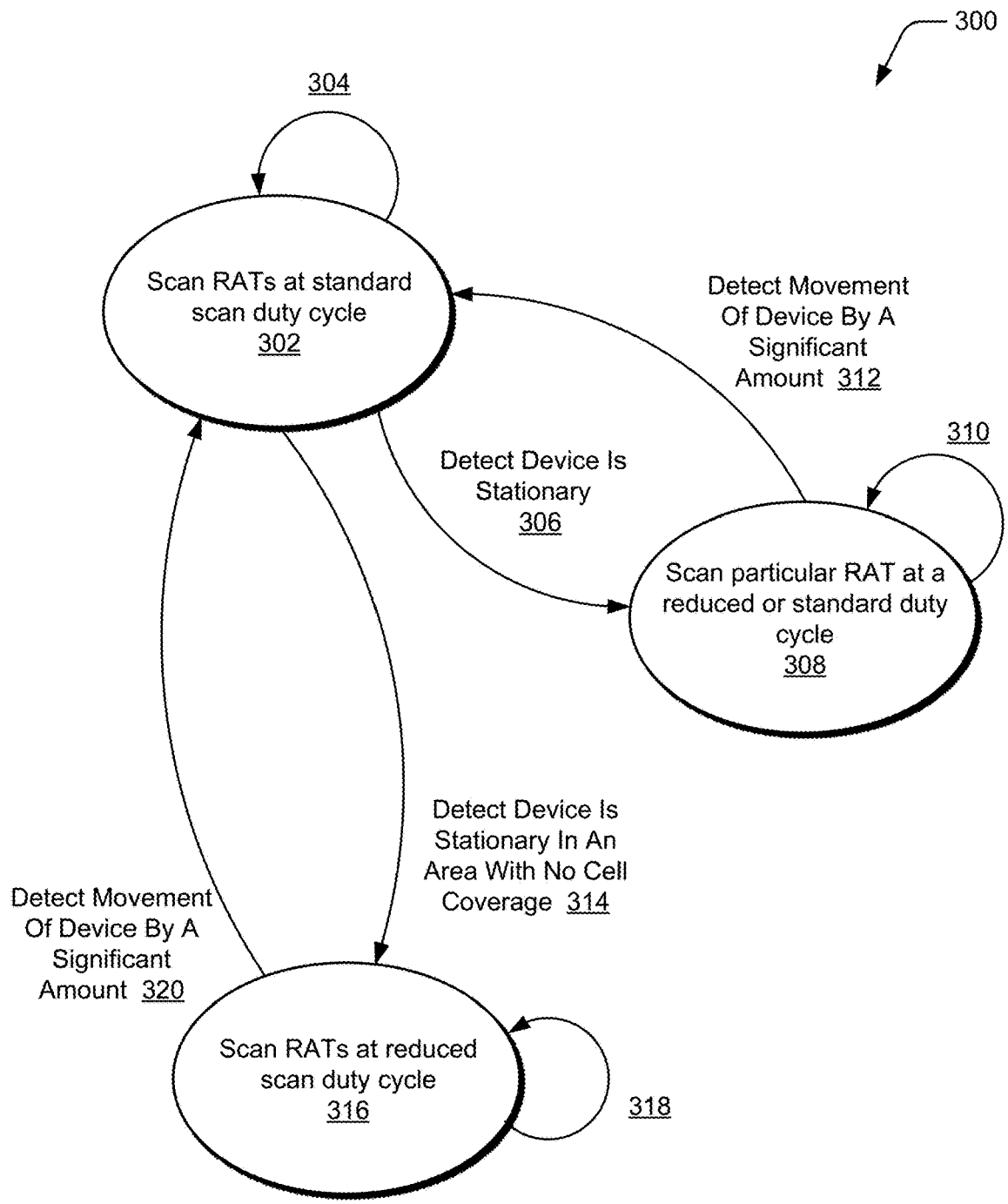
FIG. 3 illustrates an example state diagram for the modem scan duty cycle using the techniques discussed herein.

FIG. 3 illustrates an example state diagram 300 for the modem scan duty cycle using the techniques discussed herein. The state diagram 300 is discussed with additional reference to system 200 of FIG. 2. An initial state of the modem is to scan RATs at a standard duty cycle, illustrated as state 302. In state 302, the modem 116 scans for cells at a standard scan duty cycle, which refers to a default scan duty cycle (e.g., as programmed by the device or modem designer). For example, the standard scan duty cycle can be the scan duty cycle that the modem 116 is configured with when the device including the modem 116 is manufactured or sold to the user. In state 302, the modem 116 can scan for cells on all RATs, however it should be noted that given priority settings and other configuration values of the modem 116 the modem 116 may not scan for cells on all RATs. For example, if the modem 116 is configured to give 4G priority over 3G, the modem 116 may scan for 4G cells but if a 4G cell is found the modem may not scan for 3G cells.

The modem remains 304 in state 302 until the device that includes the modem 116 is detected to be stationary. In response to the device that includes the modem 116 being detected to be stationary (but in an area with cell coverage, such as a fringe area) 306, the modem 116 transitions to a state 308 in which the modem 116 scans for cells on one or more RATs at a reduced or standard duty cycle. For example, the standard scan duty cycle can be to scan for cells every 10 seconds, whereas the reduced scan duty cycle can be to scan for cells every 20 seconds or 40 seconds as discussed above. While in state 316 the reduced scan duty cycle can remain the same (e.g., at once every 20 seconds or 40 seconds) or can be further reduced in response to a scan duty cycle finding no cells to connect to (e.g., from once every 20 seconds to once every 40 seconds, then from once every 40 seconds to once every 80 seconds), as discussed above. In the state 308 the modem 116 scans for cells only on the RAT with the stronger connection and stops scanning on the RAT(s) with the weak connection(s).

Once in state 308, the modem 116 remains 310 in state 308 until the device that includes the modem 116 moves a significant amount 312. In response to the device that includes the modem 116 moving a significant amount 312, the modem 116 transitions to state 302 where the modem 116 again scans for cells at a standard scan duty cycle. In state 302 the modem 116 again scans for cells on the RAT(s) for which the modem 116 stopped scanning for cells in state 308.

While in state 302, in response to the device that includes the modem 116 being detected as stationary and in an area with no cell coverage 314, the modem 116 transitions to a state 316 in which the modem 116 scans for cells at a reduced duty cycle. This can include reducing the frequency of the scans (within band) for the RATs and/or reducing the frequency bands scanned for the RATs. For example, the standard scan duty cycle can be to scan for cells every 10 seconds, whereas the reduced scan duty cycle can be to scan for cells every 20 seconds or 40 seconds as discussed above. While in state 316 the reduced scan duty cycle can remain the same (e.g., at once every 20 seconds or 40 seconds) or can be further reduced in response to a scan duty cycle finding no cells to connect to (e.g., from once every 20 seconds to once every 40 seconds, then from once every 40 seconds to once every 80 seconds), as discussed above.

Once in state 316, the modem 116 remains 318 in state 316 until the device that includes the modem 116 moves a significant amount 320. In response to the device that includes the modem 116 moving a significant amount 320, the modem 116 transitions to state 302 where the modem 116 again scans for cells at a standard scan duty cycle. In state 302 the modem 116 again scans for cells at the standard scan duty cycle rather than the reduced scan duty cycle in state 316.

Figure 4:
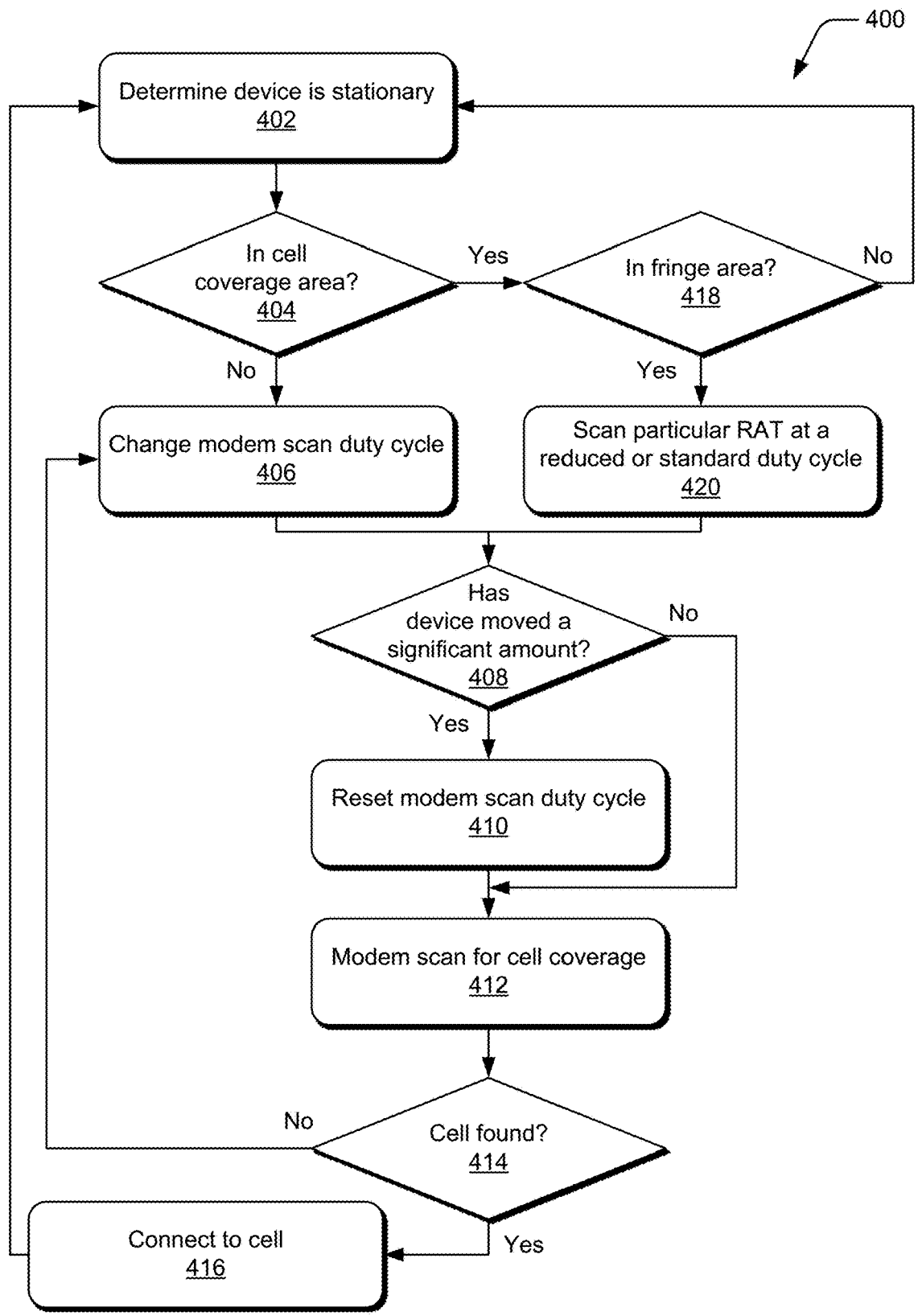
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by a modem and a modem scan management system of a computing device, such as the modem 116 and the modem scan management system 122 of FIG. 1 or FIG. 2, and can be implemented in software, firmware, hardware, or combinations thereof. Process 400 is shown as a set of acts and is not limited to the order shown for performing the operations of the various acts.

In process 400, a determination is made that the computing device is stationary (act 402). This determination can be made based on various different information, such as sensor data obtained from sensors of the data, information derived from Wi-Fi data, and so forth as discussed above.

Once stationary, a determination is made as to whether the computing device is in a cell coverage area (act 404). The computing device can be in an area in which there is cell coverage or an area in which there is no cell coverage.

If the computing device is in an area in which there is no cell coverage, then the modem scan duty cycle is changed (act 406). This can include reducing the frequency of the scans (within band) for the RATs and/or reducing the frequency bands scanned for the RATs. The modem scan duty cycle is reduced to conserve power by reducing the frequency with which the modem scans for cells.

A check is then made as to whether the computing device has moved a significant amount (act 408). This check is made based on data obtained from sensors of the computing device and/or information derived from Wi-Fi data.

If the computing device has moved a significant amount, then the modem scan duty cycle is reset (act 410). Resetting the modem scan duty cycle includes returning the modem to scanning at a standard (e.g., default) scan duty cycle on all RATs (or all RATs that the modem is by default set to scan on) and all frequency bands of each RAT (or all frequency bands that the modem is by default set to scan on).

The modem scans for a cell (act 412) at the current scan duty cycle (e.g., as reset in act 410), and a determination is made as to whether the scan results in a cell being found (act 414). If no cell is found, then the process returns to change the modem scan duty cycle (act 406), for example by further reducing the modem scan duty cycle as discussed above. Alternatively, the modem scan duty cycle may not be changed, in which case process returns to act 408 if no cell is found.

However, if a cell is found, then the modem connects to the found cell (act 416). Process 400 then returns to act 402 to determine that the computing device is still stationary. If the device is no longer stationary, then process 400 ends until the computing device is again stationary.

Returning to act 408, if the computing device has not been moved a significant amount, then the modem scans for a cell (act 412) at the current scan duty cycle (e.g., as changed in act 406).

Returning to act 404, if the computing device is in an area in which there is cell coverage, then a determination is made as to whether the computing device is in a fringe area (act 418). This determination can be made in a variety of different manners as discussed above.

If the computing device is in a fringe area, then scanning for a cell on one or more particular RATs is performed at a reduced or standard duty cycle (act 420). The scanning for a cell on at least one other RAT is stopped to conserve power by reducing the RATs on which the modem scans for cells. Process 400 then proceeds, with the modem scan for cell coverage in act 412 being performed on the one or more particular RATs other than the at least one RAT for which scanning has stopped. If the scanning for a cell on a given RAT is stopped, resetting the modem scan duty cycle in act 410 includes resuming scanning for a cell on that given RAT.

Returning to act 418, if the computing device is not in a fringe area, then process 400 returns to act 402 to determine that the computing device is still stationary. If the device is no longer stationary, then process 400 ends until the computing device is again stationary.

It should be noted that the techniques discussed herein are implemented on a computing device (e.g., the computing device 102 discussed herein) and rely on information obtained from sensors of the computing device and/or wireless data obtained from a transceiver of the computing device. Other than scanning for wireless data (e.g., Wi-Fi networks) and cells on other RATs, the computing device need not communicate with other devices to determine when to change the modem scan duty cycle (e.g., the computing device need not communicate with any remote server or database to identify known or possible networks or cells).

Figure 5:
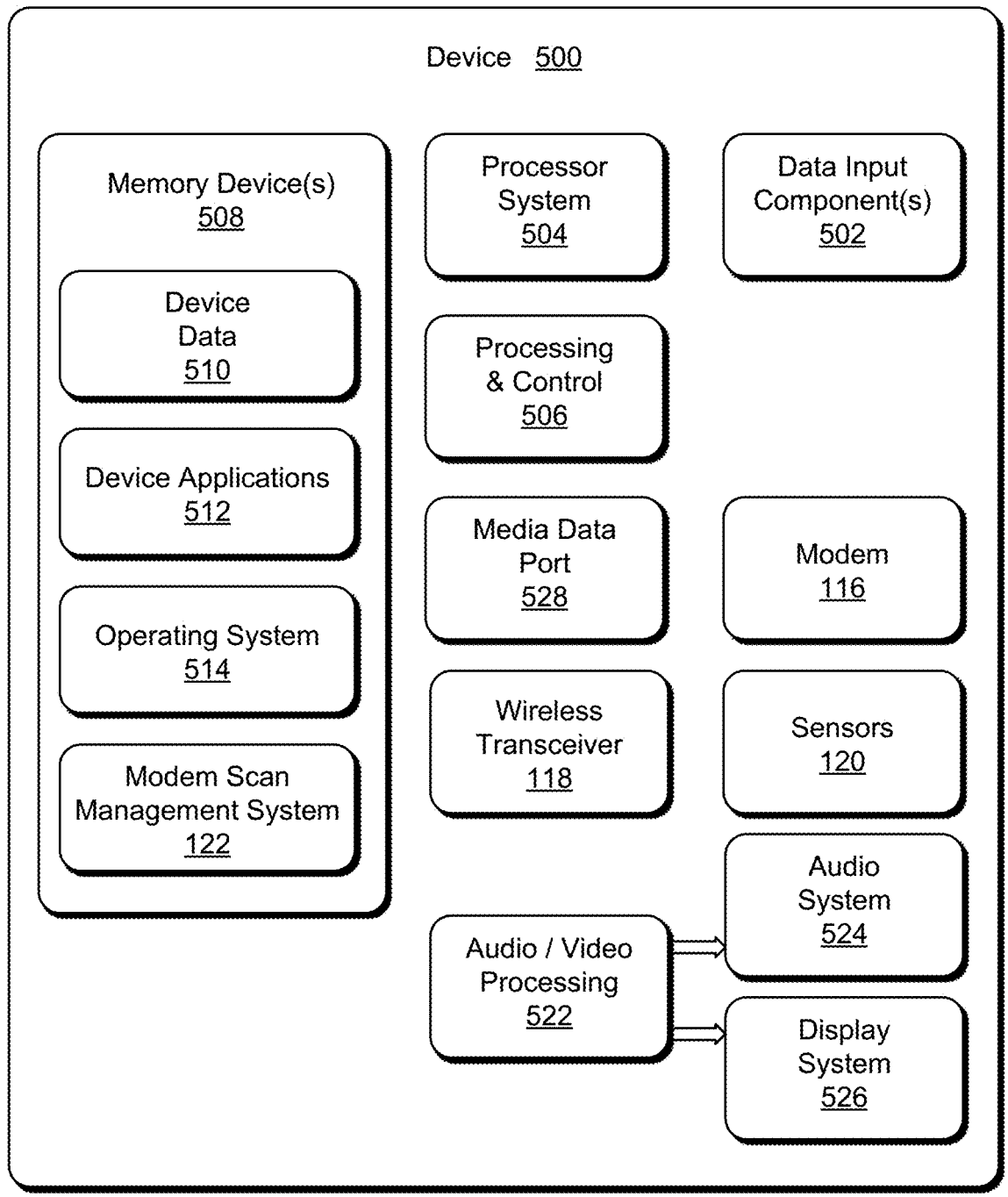
FIG. 5 illustrates various components of an example electronic device that can implement embodiments of the techniques discussed herein.

FIG. 5 illustrates various components of an example electronic device 500 that can be implemented as a computing device as described with reference to any of the previous FIGS. 1, 2, 3, and 4. The device 500 may be implemented as any one or combination of a fixed or mobile device in any form of a consumer, computer, portable, user, communication, phone, navigation, gaming, messaging, Web browsing, paging, media playback, or other type of electronic device.

The electronic device 500 can include one or more data input components 502 via which any type of data, media content, or inputs can be received such as user-selectable inputs, messages, music, television content, recorded video content, and any other type of audio, video, or image data received from any content or data source. The data input components 502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 502 may also include various other input components such as microphones, touch sensors, keyboards, and so forth.

The electronic device 500 of this example includes a processor system 504 (e.g., any of microprocessors, controllers, and the like) or a processor and memory system (e.g., implemented in a system on a chip), which processes computer executable instructions to control operation of the device 500. A processor system 504 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 500 can be implemented with any one or combination of software, hardware, firmware, or fixed logic circuitry implemented in connection with processing and control circuits that are generally identified at 506. Although not shown, the electronic device 500 can include a system bus or data transfer system that couples the various components within the device 500. A system bus can include any one or combination of different bus structures such as a memory bus or memory controller, a peripheral bus, a universal serial bus, or a processor or local bus that utilizes any of a variety of bus architectures.

The electronic device 500 also includes one or more memory devices 508 that enable data storage such as random access memory, nonvolatile memory (e.g., read only memory, flash memory, erasable programmable read only memory, electrically erasable programmable read only memory, etc.), and a disk storage device. A memory device 508 provides data storage mechanisms to store the device data 510, other types of information or data (e.g., data backed up from other devices), and various device applications 512 (e.g., software applications). For example, an operating system 514 can be maintained as software instructions with a memory device and executed by the processor system 504.

In one or more embodiments the electronic device 500 includes a modem scan management system 122, described above. Although represented as a software implementation, the modem scan management system 122 may be implemented as any form of a control application, software application, signal processing and control module, firmware that is installed on the device 500, a hardware implementation of the modules, and so on.

The electronic device 500 also includes a modem 116, a wireless transceiver 118, and one or more sensors 120, described above. These one or more sensors 120 can take various forms, such as an accelerometer, a gyroscope, a barometer, and so forth.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 508.

The electronic device 500 can also include an audio or video processing system 522 that processes audio data or passes through the audio and video data to an audio system 524 or to a display system 526. The audio system or the display system may include any devices that process, display, play, or otherwise render audio, video, display, or image data. Display data and audio signals can be communicated to an audio component (e.g., a speaker) or to a display component via a radio frequency link, S-video link, high definition multimedia interface (HDMI), composite video link, component video link, digital video interface, analog audio connection, or other similar communication link, such as media data port 528. In implementations the audio system or the display system are external components to the electronic device. Alternatively or in addition, the display system can be an integrated component of the example electronic device, such as part of an integrated touch interface.

Although embodiments of techniques for implementing controlling device modem scan duty cycle based on device sensor or wireless data have been described in language specific to features or methods, the subject of the appended claims is not necessarily limited to the specific features or methods described. Rather, the specific features and methods are disclosed as example implementations of techniques for implementing controlling device modem scan duty cycle based on device sensor or wireless data.

What is claimed is:

1. A method implemented in a computing device, the method comprising:
   determining that the computing device is stationary;
   detecting whether the computing device is in a fringe area where access to a cell is intermittent or is a weak connection, or in an area with no cell coverage;
   determining a modem scan duty cycle for at least one radio access technology based on whether the computing device is in the fringe area or in the area with no cell coverage;
   communicating a first indication of the modem scan duty cycle for the at least one radio access technology to a modem of the computing device;
   determining, after communicating the first indication to the modem, that the computing device has moved a significant amount, the determining being based on one or both of sensor data obtained from a sensor associated with the computing device and data derived from one or more wireless signals; and
   communicating a second indication of the modem scan duty cycle to the modem of the computing device, the second indication indicating to reset the modem scan duty cycle for the modem to a standard scan duty cycle.

2. The method as recited in claim 1, the method further comprising the modem scanning for a cell on the at least one radio access technology at the indicated modem scan duty cycle.

3. The method as recited in claim 1, the determining the modem scan duty cycle comprising determining, in response to determining that the computing device is in a poor service area, to stop scanning for a cell on the at least one radio access technology but to continue scanning for a cell on one or more other radio access technologies.

4. The method as recited in claim 3, the second indication indicating to resume scanning for a cell on the at least one radio access technology.

5. The method as recited in claim 1, the determining the modem scan duty cycle comprising determining to reduce the scan duty cycle in response to determining that the computing device is in an area with no cell coverage.

6. The method as recited in claim 1, wherein the determining that the computing device has moved a significant amount is based on data from the sensor rather than the data derived from one or more wireless signals.

7. The method as recited in claim 1, wherein the determining that the computing device has moved a significant amount is based on the data derived from one or more wireless signals rather than the data from the sensor.

8. The method as recited in claim 7, wherein the determining that the computing device has moved a significant amount based on the data derived from one or more wireless signals comprising determining, using a machine learning system trained on a set of training data obtained during use of the computing device.

9. The method as recited in claim 1, wherein the sensor is included in the computing device, or is external to and attached to the computing device.

10. The method as recited in claim 1, wherein the sensor is selected from the group including an accelerometer, a gyroscope, and a barometer.

11. A computing device comprising:
a processor;
a modem; and
a computer-readable storage medium having stored thereon multiple instructions that, responsive to execution by the processor, cause the processor to perform acts comprising:
determining that the computing device is stationary;
detecting whether the computing device is in a fringe area where access to a cell is intermittent or is a weak connection, or in an area with no cell coverage;
determining a modem scan duty cycle for at least one radio access technology based on whether the computing device is in the fringe area or in the area with no cell coverage, the determining the modem scan duty cycle comprising determining, in response to determining that the modem is toggling between the at least one radio access technology with a weak connection and one or more other radio access technologies, to stop scanning for a cell on the at least one radio access technology but to continue scanning for a cell on one or more other radio access technologies;
communicating a first indication of the modem scan duty cycle for the at least one radio access technology to the modem;
determining, after communicating the first indication to the modem, that the computing device has moved a significant amount, the determining being based on one or both of sensor data obtained from a sensor associated with the computing device and data derived from one or more wireless signals obtained from a wireless transceiver; and
communicating a second indication of the modem scan duty cycle to the modem of the computing device, the second indication indicating to resume scanning for a cell on the at least one radio access technology.

12. The computing device as recited in claim 11, wherein the determining that the computing device has moved a significant amount is based on the data derived from one or more wireless signals using a machine learning system trained on a set of training data obtained during use of the computing device.

13. A computing device comprising:
a processor;
a modem; and
a computer-readable storage medium having stored thereon multiple instructions that, responsive to execution by the processor, cause the processor to perform acts comprising:
determining that the computing device is stationary;
detecting whether the computing device is in a fringe area where access to a cell is intermittent or is a weak connection, or in an area with no cell coverage;
determining a modem scan duty cycle for at least one radio access technology based on whether the computing device is in the fringe area or in the area with no cell coverage, the determining the modem scan duty cycle including determining to reduce the modem scan duty cycle in response to determining that the computing device is in the area with no cell coverage;
determining, after communicating the first indication to the modem, that the computing device has moved a significant amount, the determining being based on one or both of sensor data obtained from a sensor associated with the computing device and data derived from one or more wireless signals obtained from a wireless transceiver; and
communicating a second indication of the modem scan duty cycle to the modem of the computing device, the second indication indicating to increase the modem scan duty cycle.

14. The computing device as recited in claim 13, wherein the determining that the computing device has moved a significant amount is based on the data derived from one or more wireless signals using a machine learning system trained on a set of training data obtained during use of the computing device.

15. The computing device as recited in claim 13, wherein the sensor is external to the computing device.

16. A computing device comprising:
a modem; and
a modem scan management system including a device poor service area detection module to detect whether the computing device is stationary and whether the computing device is in a fringe area where access to a cell is intermittent or is a weak connection, or in an area with no cell coverage, a modem scan control module to determine a modem scan duty cycle for at least one radio access technology based on whether the computing device is in the fringe area or in the area with no cell coverage, and to communicate a first indication of the modem scan duty cycle for the at least one radio access technology to the modem, and a movement determination module to determine, after the first indication is communicated to the modem, that the computing device has moved a significant amount, the determining being based on one or both of sensor data obtained from a sensor associated with the computing device and data derived from one or more wireless signals obtained from a wireless transceiver, the modem scan control module being further to communicate a second indication of the modem scan duty cycle to the modem, the second indication indicating to reset the modem scan duty cycle for the modem to a standard scan duty cycle.

17. The computing device as recited in claim 16, wherein the modem scans for a cell on the at least one radio access technology at the indicated modem scan duty cycle.

18. The computing device as recited in claim 16, wherein to determine the modem scan duty cycle is to determine, in response to determining that the computing device is in a poor service area based on a signal strength for a cell on the at least one radio access technology being less than a threshold value, to stop scanning for a cell on the at least one radio access technology but to continue scanning for a cell on one or more other radio access technologies.

19. The computing device as recited in claim 18, the second indication indicating to resume scanning for a cell on the at least one radio access technology.

20. The computing device as recited in claim 16, wherein to determine the modem scan duty cycle is to determine to reduce the scan duty cycle in response to determining that the computing device is in an area with no cell coverage.

* * * * *